United States Patent [19]

Seimiya

[11] 4,377,563

[45] Mar. 22, 1983

[54] METHOD OF PREPARING SILICON CARBIDE

[75] Inventor: Motoo Seimiya, Yokosukashi, Japan

[73] Assignee: Tokyo Shibaura Denki Kabushiki Kaisha, Kawasaki, Japan

[21] Appl. No.: 358,512

[22] Filed: Mar. 15, 1982

Related U.S. Application Data

[63] Continuation of Ser. No. 173,426, Jul. 29, 1980, abandoned.

[51] Int. Cl.$^3$ .............................................. C01B 31/36
[52] U.S. Cl. ................................................... 423/345
[58] Field of Search ........................................ 423/345

[56] References Cited

U.S. PATENT DOCUMENTS

| | | | |
|---|---|---|---|
| 3,271,109 | 9/1966 | Mezey et al. | 423/345 |
| 4,217,335 | 8/1980 | Sasaki et al. | 423/345 |
| 4,226,841 | 10/1980 | Komeya et al. | 423/345 |
| 4,327,066 | 4/1982 | Seimiya | 423/345 |

FOREIGN PATENT DOCUMENTS 1199953  7/1970  United Kingdom ................ 423/345

*Primary Examiner*—Jack Cooper
*Attorney, Agent, or Firm*—Oblon, Fisher, Spivak, McClelland & Maier

[57] ABSTRACT

A method of producing silicon carbide which comprises heating wet process white carbon in the presence of a carbon source.

6 Claims, No Drawings

METHOD OF PREPARING SILICON CARBIDE

This is a continuation, of application Ser. No. 173,426, filed July 29, 1980, now abandoned.

CROSS-REFERENCE TO RELATED APPLICATION

Applicants' U.S. application Ser. No. 162,819, filed June 25, 1980, now U.S. Pat. No. 4,327,066 discloses a process for preparing silicon carbide.

BACKGROUND OF THE INVENTION

1. Field of the Invention

The present invention relates to a method of preparing silicon carbide from silica.

2. Description of the Prior Art

Sintered silicon carbide has been used to manufacture articles which are subjected to high temperatures and high stresses. The thermal and mechanical properties of sintered silica carbide are greatly affected by the nature of the starting material used to prepare it. It is preferable that the silicon carbide contain as much $\beta$-SiC powder as possible.

Silicon carbide powder has been prepared by the reaction of carbon powder and silica sand by current pass heating. In this method, the heating temperature is about 1900° C. which is very high and causes vaporization of silica sand. Consequently, the amount of silicon carbide recovered is relatively low. Further, this reaction requires a long reaction time.

A need exists for a process of producing $\beta$-SiC powder at high yields with short reaction times.

SUMMARY OF THE INVENTION

Accordingly, it is an object of the present invention to provide a method of preparing silicon carbide in a short period of time.

It is another object of the present invention to provide a method of preparing silicon carbide at low temperatures.

Yet another object of the present invention is to provide a method of preparing high yields of $\beta$-SiC.

These and other objects have now been attained in the present invention by heating white carbon, prepared by wet process (wet process white carbon) and a source of carbon.

DETAILED DESCRIPTION OF THE PREFERRED EMBODIMENTS

White carbon is a type of silica and was first commercialized by Pittsburgh Plate Glass Company as Hi-Sil ®. It has been used to reinforce rubber. However, it has not generally been considered as a suitable raw material for the production of silicon carbide because it is not highly purified. However, heating wet process white carbon, in the presence of a carbon source, it is easy to produce silicon carbide having a high content of $\beta$-SiC in a short period of time. The wet process and the dry process are well known processes for the preparation of white carbon. However, in the present invention, wet process white carbon is preferred because heating white carbon prepared by the dry process (dry process white carbon) in the presence of a carbon source requires a long reaction time to produce silicon carbide. Any wet process white carbon may be used in the present invention. Typical wet processes used to produce wet process white carbon are as follows:

1. Dissociating alkali metal silicate with an acid. For example, $Na_2O(SiO_2)_n + H_2SO_4 \rightarrow nSiO_2 + H_2O + Na_2SO_4$ 2. Dissociating alkali metal silicate with an ammonium salt. For example, $Na_2O(SiO_2)_n + 2NH_4Cl \rightarrow nSiO_2 + 2NaCl + H_2O + 2NH_3$ 3. Dissociating alkali earth metal silicate with an acid. The alkali earth metal silicate is prepared by a reaction between alkali metal silicate and alkali earth metal salt. For example, $Na_2O(SiO_2)n + CaCl_2 \rightarrow CaO(SiO_2)_n + 2NaCl$; or $CaO(SiO_2)_n + 2HCl \rightarrow nSiO_2 + CaCl_2 + H_2O$.

4. Adding sodium silicate and carbonic acid gas to mother liquid for sodium hydrogen carbonate in the ammonia soda process.

5. Dissociating sodium silicate by ion-exchange separation.

The preferred source of wet process white carbon is that prepared by the process of dissociating alkali metal silicate with an acid, because of its high reactivity.

In order to minimize the reaction time, it is advantageous to use finely divided wet process white carbon. The use of finely divided wet process white carbon is not, however, critical if longer reaction times are acceptable. Preferably, the mean particle size of the wet process white carbon is between about 0.015 and 0.035 microns. Preferably, the surface area of the wet process white carbon is between about 50 and 350 m$^2$/g.

Any source of carbon may be used. Suitable sources of carbon include solid carbon, such as carbon black, coke powder and charcoal, or carbon containing materials which are gases under the reaction conditions such as hydrocarbons, especially lower paraffinic hydrocarbons having from 1 to about 7 carbon atoms.

A reducing gas such as hydrogen may be used if it is desired to conduct the reaction in a reducing atmosphere.

The reaction temperature is typically from about 1200° to about 1600° C.; more preferable 1350° to 1500° C. When the reaction temperature is too low, the reaction will progress too slowly to be of practical value. When the reaction temperature is too high, vaporization of the white carbon may occur. Preferably, the reaction time is 1.5 hours at 1550° C. and 8 hours at 1300° C. However, longer or shorter reaction times may be used.

Silicon carbide powder, obtained by this reaction, may be heated in an oxidizing atmosphere, for instance air, to remove the carbon adhered on the surface of the silicon carbide powder, temperatures from about 600° to 1000° C. are suitable.

Having generally described this invention, a further understanding can be obtained by reference to certain specific examples which are provided herein for purposes of illustration only and are not intended to be limiting unless otherwise specified.

EXAMPLES

The results of Examples 1 and 2 are tabulated in the table following Example 2.

EXAMPLE 1

1. Wet process white carbon raw material; Vitasil #550 (manufactured by Taki Chemical Company of Japan, mean particle size of 0.025 micron and a surface area of 250 to 300 m$^2$/g).

2. Volume of wet process white carbon charged; 4.32 g.

3. Volume of carbon powder charged; 1.68 g.

4. Boat volume to be filled with white carbon and carbon powder; 20 cc.
5. Boat material; carbon.
6. Gas atmosphere; $H_2$, 100 l/hr.
7. Heating temperature; 1410° C.
8. Heating time; 6 hours.
9. Additional heating condition to remove adhered carbon; 700° C. for 3 hours in air.

EXAMPLE 2

1. Wet process white carbon raw material; Vitasil #1500 (manufactured by Taki Chemical Company of Japan, mean particle size of 0.018 micron and a surface area of 180 to 230 m$^2$/g).
2. Heating temperature; 1310° C.
3. Heating time; 5 hours.
4. Other conditions identical to those of Example 1.

TABLE 1

| Example | Phases Detected by X-ray Deffraction Analysis | | | | Chemical Analysis |
|---|---|---|---|---|---|
| | β-SiC | Si | SiO$_2$ | Si$_3$N$_4$ | O |
| 1 | 99 wt. % | ND* | 1 wt. % | ND | 1.0 wt. % |
| 2 | 98 wt. % | ND | 2 wt. % | ND | 1.6 wt. % |

*ND: Not detectable

Having now fully described the present invention, it will be apparent to one of ordinary skill in the art that many changes and modifications can be made thereto without departing from the spirit or scope of the invention as set forth herein.

What is claimed as new and intended to be covered by Letters Patent is:

1. A method of producing β-silicon carbide consisting essentially of heating a mixture consisting of wet process white carbon and a source of carbon in a hydrogen atmosphere to a temperature of 1200° C. to 1600° C., said wet process white carbon being produced by the process of dissociating an alkali metal silicate with an acid, and having a mean particle size between 0.015 and 0.035 micron and a surface area between 50 and 350 m$^2$/g.

2. The method of claim 1, wherein the wet process white carbon is heated to a temperature of 1350° C. to 1500° C.

3. The method of claim 1 wherein the silicon carbide powder produced is heated in an oxidizing atmosphere to remove carbon adhered to the surface of said silicon carbide powder.

4. The method of claim 1, wherein said carbon source is gaseous in the temperature range of 1200° C. to 1600° C.

5. The method of claim 4, wherein said carbon source is a hydrocarbon.

6. The method of claim 1, wherein said carbon source is a solid carbon.

* * * * *

UNITED STATES PATENT AND TRADEMARK OFFICE
CERTIFICATE OF CORRECTION

PATENT NO. :   4,377,563
DATED      :   March 22, 1983
INVENTOR(S) :  M. Seimiya It is certified that error appears in the above-identified patent and that said Letters Patent is hereby corrected as shown below:

On the title page:
Please insert the following Foreign Application Priority

Data:

[30] -- Foreign Application Priority Data

November 22, 1979   [JP] Japan.....150740/79 --

Signed and Sealed this

Seventeenth Day of May 1983

[SEAL]

Attest:

DONALD J. QUIGG

Attesting Officer   Acting Commissioner of Patents and Trademarks